United States Patent
Toyota et al.

[11] Patent Number: 6,109,393
[45] Date of Patent: Aug. 29, 2000

[54] GEAR TYPE OF MANUAL TRANSMISSION FOR AUTOMOTIVE VEHICLE

[75] Inventors: Hideo Toyota; Naoaki Yoshimoto, both of Hiroshima, Japan

[73] Assignee: Mazda Motor Corporation, Hiroshima, Japan

[21] Appl. No.: 08/941,205

[22] Filed: Sep. 30, 1997

[30] Foreign Application Priority Data

Sep. 30, 1996 [JP] Japan .................................. 8-259797

[51] Int. Cl.⁷ .................................................. F16H 57/00
[52] U.S. Cl. ...................... 184/6.12; 184/13.1; 184/11.2; 74/606 R
[58] Field of Search ................. 184/13.1, 11.2, 184/6.12; 74/606 R, 473.1

[56] References Cited

U.S. PATENT DOCUMENTS

| | | | |
|---|---|---|---|
| 3,195,682 | 7/1965 | Reneerkens | 184/6.12 |
| 3,618,711 | 11/1971 | Vollmer | 184/6.12 |
| 4,222,283 | 9/1980 | Nagy | 74/467 |
| 4,231,266 | 11/1980 | Nishikawa et al. | 74/467 |
| 4,329,887 | 5/1982 | Kawamoto | 74/467 |
| 4,359,909 | 11/1982 | Sogo | 74/467 |
| 5,052,238 | 10/1991 | Sewell | 74/473 |
| 5,092,196 | 3/1992 | Kameda et al. | 74/606 R |
| 5,325,739 | 7/1994 | Toyota et al. | 74/606 R |
| 5,946,971 | 9/1999 | Toyota et al. | 74/606 R |

FOREIGN PATENT DOCUMENTS

| | | |
|---|---|---|
| 2-22452 | 2/1990 | Japan . |
| 2-38736 | 2/1990 | Japan . |
| 2-931 51 | 4/1990 | Japan . |

OTHER PUBLICATIONS

Marks' Standard Handbook of Mechnical Engineers, pp. 8–132–8–133, 1978.

*Primary Examiner*—David A. Bucci
*Assistant Examiner*—William C Joyce
*Attorney, Agent, or Firm*—Nixon Peabody LLP; Donald R. Studebaker

[57] ABSTRACT

An output reduction gear type of manual transmission having a reduction gear chamber formed by partitions disposed on opposite sides of a reduction gear unit, an oil inflow structure comprising an oil inflow passage formed at a lower end of the reduction gear unit and tapered roller bearings supporting an output shaft and a counter shaft which are coupled by the reduction gear unit, an oil outflow structure comprising an oil tray which collects oil splashed by the counter shaft and the reduction gear unit and an oil outflow passage formed at an upper part of the reduction gear unit.

10 Claims, 7 Drawing Sheets

GEAR TYPE OF MANUAL TRANSMISSION FOR AUTOMOTIVE VEHICLE

BACKGROUND OF THE INVENTION

1. Field of the Invention

This invention relates to a gear type of manual transmission for an automotive vehicle, and, more particularly, to a gear type of manual transmission having an improved lubrication system for an automotive vehicle.

2. Description of Related Art

A gear type of manual transmissions connected, for example, to an engine which is installed in an engine compartment of an automotive vehicle with its output shaft directed in the longitudinal direction of the vehicle generally include four shafts, namely input and output shafts arranged in coaxial alignment with each other, a counter shaft arranged in parallel with those input and output shafts, and a reverse idler shaft. Counter or cluster gears of a plurality of gear units are disposed on the counter shaft, and others are disposed on either the input shaft or the output shaft, or the reverse idler shaft.

The manual transmission generally transmits input torque to the counter shaft through a unit of an input gear and a counter reduction gear at a specified reduction ratio and then to the output shaft through selected one of various speed gear units. This manual transmission is called an "Input Reduction Gear Type" because speed reduction is made between the input shaft and the counter shaft. The input reduction gear type of manual transmission has an input gear and a reduction gear fixed to the input shaft and the counter shaft, respectively.

Manual transmissions, which are called an "Output Reduction Gear Type," have a reduction gear unit comprising an output reduction gear and a counter reduction gear fixedly disposed on the output shaft and the counter shaft, respectively, to reduce output torque. Such an output reduction gear type of manual transmission is known from, for example, Japanese Unexamined Patent Publication No. 2-93151. In this type of manual transmission, input torque is transmitted to the counter shaft without being multiplied, and torque applied to each of the counter gears except the counter reduction gear is low consequently. While the transmission has the advantage that the counter gears are made small in diameter and thin, which is always desirable for the transmission to be small in size, nevertheless, various constraints are imposed on the counter reduction gear. Specifically, since torque is reduced by the reduction gear unit before transmitted to the output shaft, the output reduction gear is required to have strength and rigidity higher than the input reduction gear of the input reduction gear type of manual transmission, and consequently required to have a large face width. Due to the output reduction gear which has a large face width and to which large torque is applied, parts of the output shaft and the counter shaft on which the reduction gears are disposed and firmly borne or supported by strong bearing structures. As taught in, for example, Japanese Unexamined Utility Patent Publications Nos. 2-22452 and 2-38736, in order to meet the demand, it is known to use tapered roller bearings, which are capable to withstand both high radial and thrust loads, to support the output shaft and/or the counter shaft on both sides of the reduction gear. Regarding tapered roller bearings used in the transmission, it is known in the art that lubricating oil is easily drawn in a direction of a diameter change from small to large of an inner race of the tapered roller bearing due to a centrifugal force generated by revolutions of the shaft fitted in the inner race.

Further, considering the rotational speed of the counter shaft of the input reduction gear type of conventional manual transmission, it depends upon the gear ratio of a reduction gear unit disposed between the input and counter shafts, and hence lower than the speed of rotation of the input shaft in spite of gears. As against, the rotational speed of the counter shaft of the output reduction gear type of manual transmission depends upon the gear ratio of a selected gear. Accordingly, it is increased higher than that of the input shaft when the selected gear is somewhat higher. In other words, if both types of manual transmissions have reduction gear units of a same gear ratio, the rotational speed of the output reduction gear type of manual transmission is significantly higher than that of the input reduction gear type of manual transmission when specific higher gears are selected. In such a case, the counter reduction gear turns at a significantly high rotational speed.

While the counter shaft rotates at an increased rotational speed, a bearing for any racing gear (which refers to a gear rotating relatively to the shaft on which it is disposed) is put under extremely rigorous lubrication conditions. Especially, a racing gear of a reverse gear unit rotates in an opposite or counter direction to the direction of rotation of the counter shaft by means of the reverse idler gear, the relative speed between the counter shaft and the racing gear becomes extremely higher. Regarding a reverse and a first gear unit which have large reduction ratios, in the case that a smaller gear of the reverse gear unit or the first gear unit is disposed for relative rotation on the input shaft, the relative speed of the small gear with respect to the input shaft is extremely high, putting the bearing of the racing gear, in particular, under extremely rigorous lubrication conditions.

In the gear type of manual transmission, the utilization is made of counter racing gears to splash and supply oil in an oil sump of the transmission housing to mating teeth of gears and bearings for racing gears and their associated moving parts for lubrication. The oil splashes mostly hit against an interior wall of the transmission case and flows down along the wall. During flowing down, the oil looses heat and is cooled to some degree before supplied to those moving parts.

It is necessary to consider effects of stir resistance caused due to rotations of the counter shaft and counter gears to temperature of lubricating oil. In order to decrease the stir resistance to control an increase in oil temperature, it is desirable to reduce the amount of lubricating oil as small as possible within the limits. For the output reduction gear type of manual transmission, in particular, there is a strong demand for decreasing the amount of lubricating oil because, while a higher gear is provided, the rotational speed of the counter gear is higher as compared with that of the input reduction gear type of manual transmission. However, it is hard for the conventional manual transmissions to overcome these somewhat conflicting demands that govern decreasing the amount of lubricating oil and reliable lubrication of moving parts of the transmission.

SUMMARY OF THE INVENTION

It is accordingly a primary object of the invention to provide a gear type of manual transmission which performs reliable and efficient supply of lubricating oil to moving parts.

The foregoing object of the invention is accomplished by providing what is called an output reduction gear type of manual transmission which has a reduction gear unit always operationally coupling a counter shaft to an output shaft disposed in parallel with the counter shaft to transmit a rotation of the counter shaft to the output shaft and a plurality of gear units having different gear ratios which are brought into operation to couple the input shaft to the counter shaft to transmit a rotation of the input shaft to the output shaft through the counter shaft so as thereby to provide desired gear ratios of the transmission gear. The transmission at an output side is provided with a partition means, such as including a front and a rear partition, to form a gear chamber in a transmission case so as to enclose and isolates the reduction gear from the transmission gear units, an oil supply means for supplying oil reserved in a bottom reservoir of the transmission case into the gear chamber, and an oil return means for causing oil splashed up by the reduction gear to flow out of the gear chamber toward the bottom reservoir section.

Oil supply means comprises at least one of tapered roller bearings held by the partitions for supporting the output shaft and the counter shaft on both sides of the reduction gear and may further comprise an oil inflow passage formed in a lower part of the partition through which the inside and the outside of the gear chamber are communicated with each other. The oil return means comprises an oil outflow passage formed in an upper part of the partition above the reduction gear through which the inside and the outside of the gear chamber are communicated with each other and further may comprise an oil tray, preferably formed integrally with the transmission case, which is disposed adjacent to the oil outflow passage to receive oil splashed by the reduction gear. The oil tray is positioned off a vertical plane enclosing center lines of rotation of the output shaft and the counter shaft. More specifically, the oil tray is preferably positioned off said vertical plane on a side remote from a side wall of the transmission case against which the counter shaft and the reduction gear splash oil directly.

The output reduction gear type of transmission of the invention may have a input side lubrication system comprising divisional oil flow passages which are formed in a reverse idler shaft, the input shaft and the counter shaft, respectively, and connected in series in this order so as to supply oil in the bottom reservoir of the transmission case to moving parts to be lubricated which are disposed on input side sections of those shafts therethrough.

BRIEF DESCRIPTION OF THE DRAWINGS

The above and other objects of the present invention will be understood from the following description of a specific embodiment thereof when considering in conjunction with the accompanying drawings, in which.

DETAILED DESCRIPTION OF THE SPECIFIC EMBODIMENT

Figure 1:
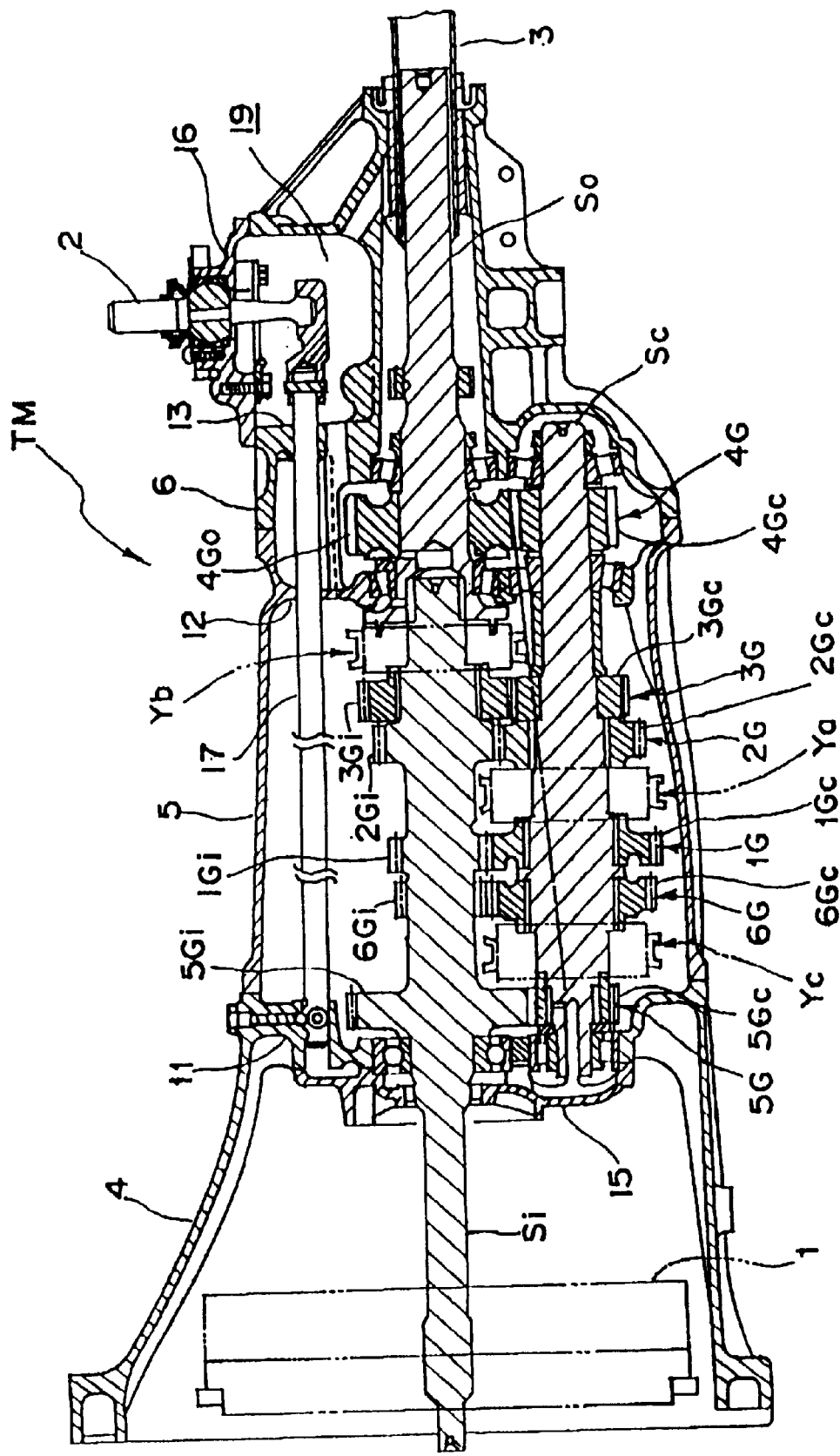
FIG. 1 is a cross-sectional view schematically showing an overall construction of a gear type of manual transmission in accordance with an embodiment of the invention.

Referring to the drawings in detail, particularly to FIG. 1, a gear type of manual transmission (which is hereafter referred to as a transmission for simplicity) TM in accordance with an embodiment of the invention is shown. In this embodiment, the transmission TM, which is connected to an engine (not shown) arranged with its crankshaft directed in a longitudinal direction of what is called a front engine-rear drive type of automotive vehicle, has five forward speed gear units 1G–5G and one reverse gear 6G and is designed and adapted to directly interconnect an input and an output shaft by means of, for example, the fourth speed gear unit.

The transmission TM has an input and an output shaft Si and So arranged coaxially in a straight line and a counter shaft Sc disposed below and in parallel with these input and output shafts Si and So in a transmission housing 5. The transmission TM further has a plurality of gear units 1G–6G having different gear ratios, Each gear unit, one gear of which is disposed on either the input shaft Si or the output shaft So and the other is disposed on the counter shaft Sc, are brought into mesh with each other when the transmission TM is shifted to the gear. As will be described in detail later, the transmission is of the output reduction gear type which has a reduction gear unit 4G consisting of an output reduction gear 4Go fixed to the output shaft So and a counter or counter reduction gear 4Gc fixed to the counter gear Sc. The reduction gear unit 4G is preferably positioned at one end of the counter shaft Sc closer to an output end of the transmission TM.

Input shaft Si at one of its ends (on the left side as viewed in FIG. 1) is connected to an output shaft (not shown) of the engine by means of an engine clutch 1. On the other hand, the input shaft Si at another end or output end (on the right side as viewed in FIG. 1) is joined together to one of its ends, namely an input end, of the output shaft So. The output shaft So at another or output end is connected to a propeller shaft (not shown) through a sleeve shaft 3. The transmission case is comprised of a clutch housing, a transmission housing 5 and rear extension housing 6 arranged in the longitudinal direction in order from the engine side and connected to one another. The transmission case is formed with partitions 11–13 extending radially from the interior walls of the housings 4–6 by which bearings are held to support the shafts Si, So and Sc in the transmission case. In this instance, the partition 11 formed between the clutch housing 4 and the transmission housing 5 is closed by a front cover 15. The extension housing 6 is provided with a shift lever gate chamber 19 in which a shift lever 2 and three shift rods 17 (only one of which appears in FIG. 1) are partly accommodated and which is covered at a top by a cover 16.

Gear assembly arranges, in order from the input side to the output side the fifth speed gear unit 5G, the reverse gear unit 6G, the first speed gear unit 1G, the second speed gear unit 2G, the third speed gear unit 3G and the reduction gear unit 4G, and is divided into, for example, three groups as a 5-R group (the fifth and reverse gear units 5G and 6G), a 1–2 group (the first and second gear units 1G and 2G) and a 3–4 group (third and fourth gear units 3G and 4G). The reverse gear unit 6G, the second speed gear unit 2G and the reduction gear unit 4G are disposed on the output sides of the respective gear units, respectively, as output gears of the gear units. Among the counter gears, a third and a fourth counter gear 3Gc and 4Gc are fixedly installed to the counter shaft Sc, and the remaining counter gears 1Gc, 2Gc, 5Gc and 6Gc are installed as racing gears on the counter shaft Sc.

Figure 5:
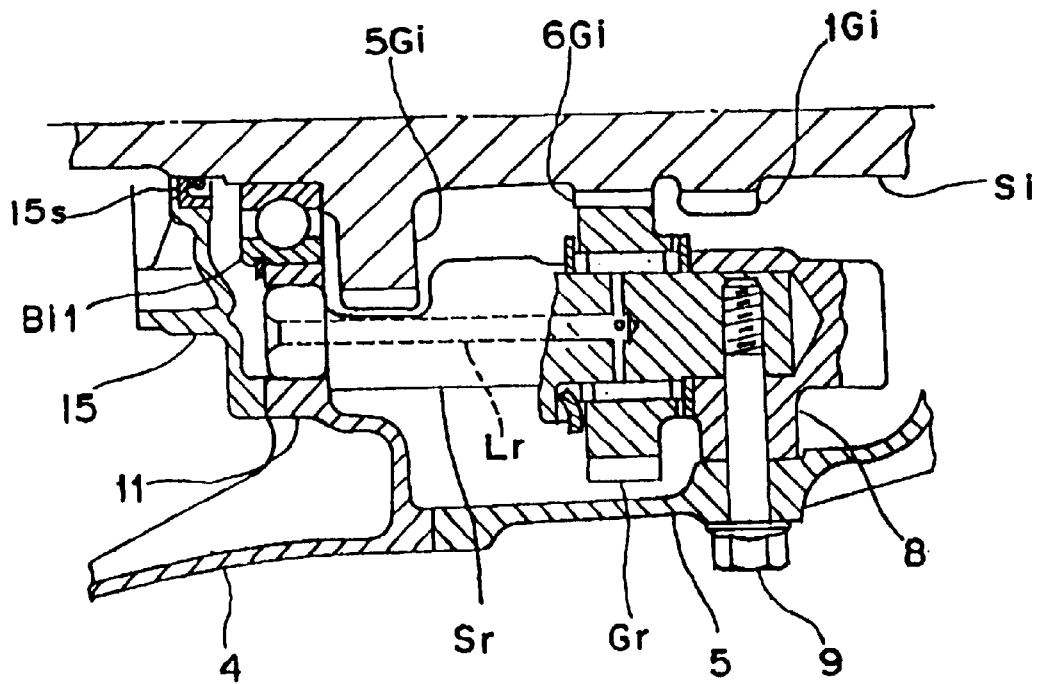
FIG. 5 is an explanatory view, partly in sectional, showing a reverse idler shaft fitted to a transmission case.
Figure 6:
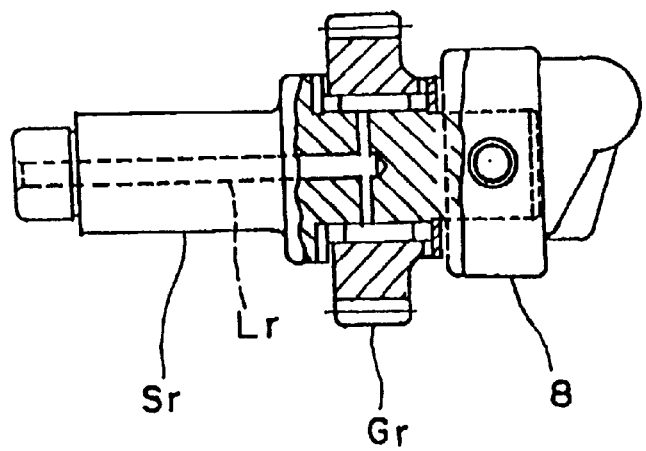
FIG. 6 is an explanatory view, partly in sectional, showing a reverse idler gear disposed on the reverse idler shaft.
Figure 7:
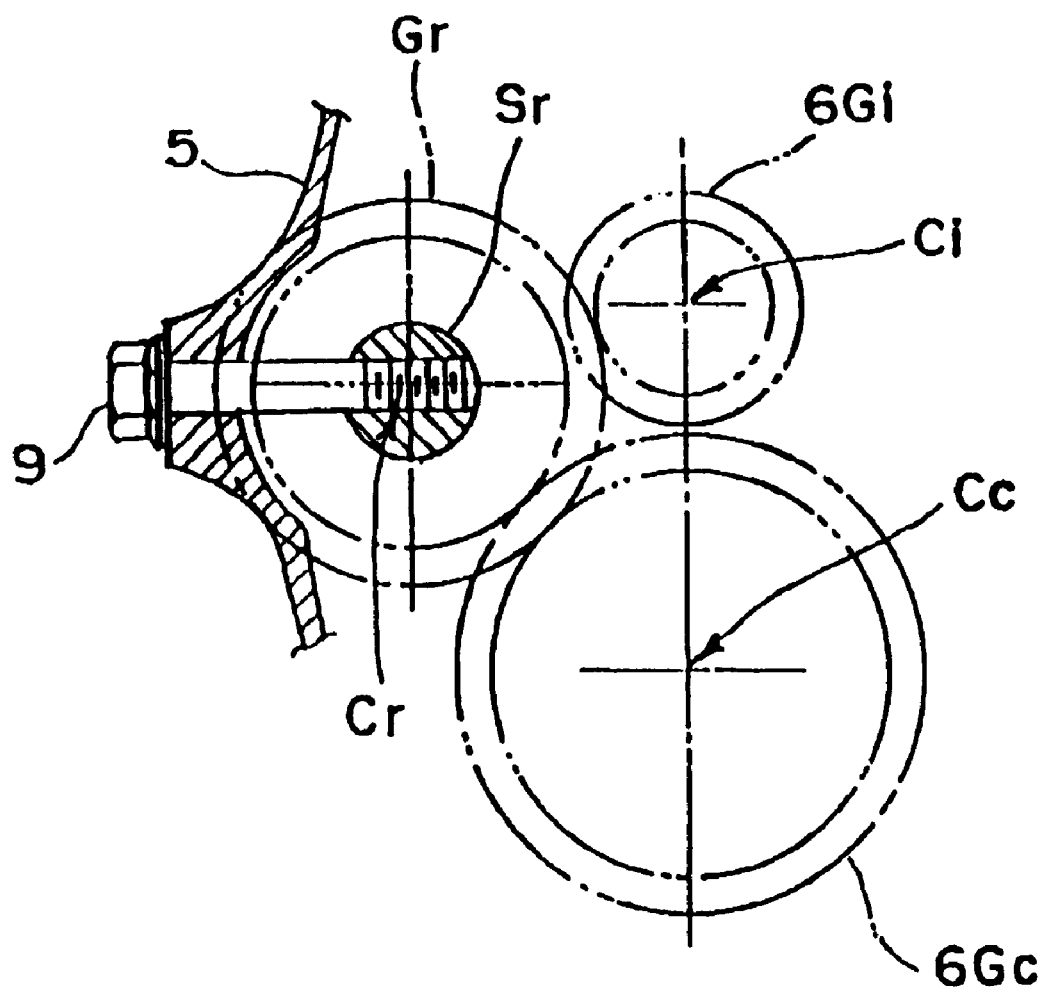
FIG. 7 is an explanatory view showing the installed height of the reverse idler shaft.

As shown in FIGS. 5–7, the reverse gear unit 6G includes a reverse idler gear Gr fixedly installed to a reverse idler shaft Sr which operationally couples the fixed reverse gear 6Gi and the counter reverse idler gear 6Gc and drives the output reverse gear 6Gi in a direction opposite to the direction of rotation of output gears of the forward speed gear units 1G–5G. The reverse idler shaft Sr, which is supported by and between the partition 11 and a fitting mount 8 fastened to the transmission housing 5 by a bolt 9, has a lengthwise or axial flow passage of oil Lr extending to the bearing holding the reverse idler gear Gr. As seen clearly in FIG. 7, the reverse idler shaft Sr is positioned to locate the center axis of rotation Cr at a vertical height slightly lower than the center axis of rotation Ci of the input shaft Si but somewhat higher than the center axis of rotation Cc of the counter shaft Sc.

Referring back to FIG. 1, the reduction gear unit 4G consists of the output and counter gears 4Go and 4Gc installed as fixed gears on the output shaft So and the counter shaft Sc, respectively. The output reduction gear 4Go is coupled to the input shaft Si by a needle bearing secured to the output shaft So so as to rotate relatively to the input shaft Si. That is, the reduction gear unit 4G forms a reduction gear unit to impart a reduced rotation to the output shaft So from the counter shaft Sc. This structure of the reduction gear unit with the output reduction gear 4Go and the counter reduction gear 4Gc operationally integral with the output shaft So and the counter shaft Sc, respectively, forms the transmission TM as an output reduction gear type. During engine idle or while the transmission TM is left neutral, the counter shaft Sc does not race.

Since the transmission TM constructed in the output reduction gear type imparts the engine torque to the counter shaft Sc from the input shaft Si with no torque multiplication, loads applied to the component gears except the reduction gear unit 4G is low, which is always desirable for the respective gear units to be made thin and small in size. However, because the reduction gear unit 4G at a position closest to the output end of the gear assembly reduces a rotation of the counter shaft Sc with torque multiplication, the output reduction gear 4Go and the counter reduction gear 4Gc are as a necessity strength and rigid more as compared with those of the conventional input reduction gear type of transmission, which leads to a large face width.

Each gear group is accompanied by a synchronizing mechanism, which is otherwise called a synchro-mesh mechanism, Ya, Yb, Yc to mesh one gear of a gear unit with another quietly and without damage. The synchronizing mechanisms Ya and Yc for the 1–2 gear group and the 5-R gear group, respectively, of which the counter gears are idling, are installed on the counter shaft Sc, and the synchronizing mechanism Yb for the 3–4 gear group, of which the input gears are idling, is installed on the input shaft Si. Such synchronizing mechanisms are well known in construction and operation to those skilled in the art, so that a more detailed description is not necessary.

When the shift lever 2 is operated to bring any gear unit other than the reduction gear unit ready, the racing gear of a corresponding gear unit is coupled in motion to the shaft on which the racing gear is installed and brought into mesh with the counter gear of the gear unit, driving the counter shaft Sc. When the counter shaft Sc is turning, a rotation is reduced by the reduction gear unit 4G and imparted to the output shaft So with torque multiplication through the reduction gear unit 4G. However, when ready for the reduction gear, the input and output shafts Si and So are directly coupled in motion.

Different from the conventional input reduction gear type of transmission, the output reduction gear type of transmission provides different rotational speeds of the counter shaft Sc for different speed gears. Specifically, the counter shaft Sc turns at speeds higher than the input shaft Si when it is in specified higher speed gears. When the counter shaft Sc turns faster than the input shaft Sc, the bearing of a racing gear of any gear unit is put under extremely rigorous lubrication conditions while the racing gear is racing. In particular, when the counter shaft Sc is turning, the counter reverse idler gear 6Gc also turns, but in an opposite or counter direction by means of the reverse idler gear Gr. As a result, the counter idler gear 6Gc turns at a significantly high relative rotational speed with respect to the counter shaft Sc. In the case that the first speed gear unit 1G or the reverse gear unit 6G, which has a relatively high reduction ratio, has a small gear as a racing gear, the rotational speed of the racing gear relative to the shaft on which the racing gear is installed is significantly high when the transmission is in higher speed gears. The bearing holding such a racing gear is put under especially rigorous lubrication conditions.

If all of the synchronizing mechanisms Ya-Yc are installed on the input shaft Si, the gears on the input shaft Si, which are all racing, in particular the small gears of the first speed gear unit 1G and the reverse gear unit 6G, get significantly high rotational speeds relative to the input shaft Si when the transmission is in higher speed gears. As a result, the counter shaft Sc is in a condition to turn at an increased rotational speed, there are apprehensions of seizing or burning in the bearing for the racing gear. In particular, the bearing for the counter reverse idler gear 6Gc turning in an opposite or counter direction relative to the counter shaft Sc is conspicuous for showing a high tendency to seize.

From the above technical background, the transmission TM of the invention has an arrangement of the synchronizing mechanisms Ya and Yc for the 1–2 gear group and the 5-R gear group, respectively, installed on the counter shaft Sc and their related small gears 1Gi and 6Gi of the first speed gear unit 1G and the reverse gear unit 6G, respectively, fixedly installed on the input shaft Si. Accordingly, the small gears 1Gi and 6Gi turn at the same rotational speed as the input shaft Si in spite of selected speed gears. The counter large gears 1Gc and 6Gc of the first speed gear unit 1G and the reverse gear unit 6G, which are installed for rotation on the counter shaft, turn relatively to the counter shaft Sc at a relative rotational speed lower than the rotational speed of the smaller input shaft gears 1Gi and 6Gi, the transmission TM of the invention encounters no large difference in relative rotational speed which occurs between the racing gear of the first speed unit 1G or the racing gear of the reverse gear unit 6G and the input shaft Si in an output reduction gear type of transmission with the synchronizing mechanisms Ya and Yc arranged on the input shaft Si.

Output reduction gear type of transmission described above provides a significantly high rotational speed of the counter shaft Sc in higher speed gears, and accordingly, the bearings for the racing gears 1Gc, 2Gc, 5Gc and 6Gc, in particular the counter small gear 5Gc, on the counter shaft Sc are put under especially rigorous lubrication conditions. It is also important how to reliably supply lubricating oil to the bearing for the reverse idler gear Gr placed between the fixed reverse gear 6Gi and racing reverse idler gear 6Gc of the reverse gear unit 6G.

Similarly to the conventional gear type of transmission, the output reduction gear type of transmission TM of the invention contains lubricating oil in the transmission case, in particular in the transmission housing 5 and extension housing 6 at a specified level as shown by a double-dotted straight line in FIG. 1. It is noted that the transmission TM is installed with a small inclination to the horizontal plane. Counter gears on the counter shaft Sc positioned closer to the bottom of the transmission case are used to splash and supply the oil to mating teeth of various gear units 1G–6G and the bearings for the racing gears 1Gi–3Gi, 5Gi and 6Gi, and other moving parts to be lubricated. The oil splashes mostly hit against an interior wall of the transmission case and flow down along the interior wall of the transmission case. During flowing down, the oil looses heat and is cooled to some degree before supplied to those moving parts.

In order to reduce stir resistance of the oil caused due to a rotation of the counter gears and the counter shaft Sc on which a rise in oil temperature depends, it is desired to decrease the amount of oil staying in the transmission case to a level as low as permissibly. There is an especially strong demand for decreasing the amount of oil in the transmission case on the output reduction gear type of transmission of which the counter shaft Sc turns at a speed significantly higher in higher speed gears as compared with the input reduction gear type of transmission. For that reason, the transmission TM of the invention is incorporated with a contrived flow passage of oil for the gear assembly at the input side which achieves both decrease in the amount of oil to be filled in the transmission case and reliable lubrication of the moving parts. The flow passage of oil comprises three parts of flow passages of oil formed in the reverse idler shaft Sr, the input shaft Si and the counter shaft Sc, respectively, which are connected in series in this order.

Figure 2:
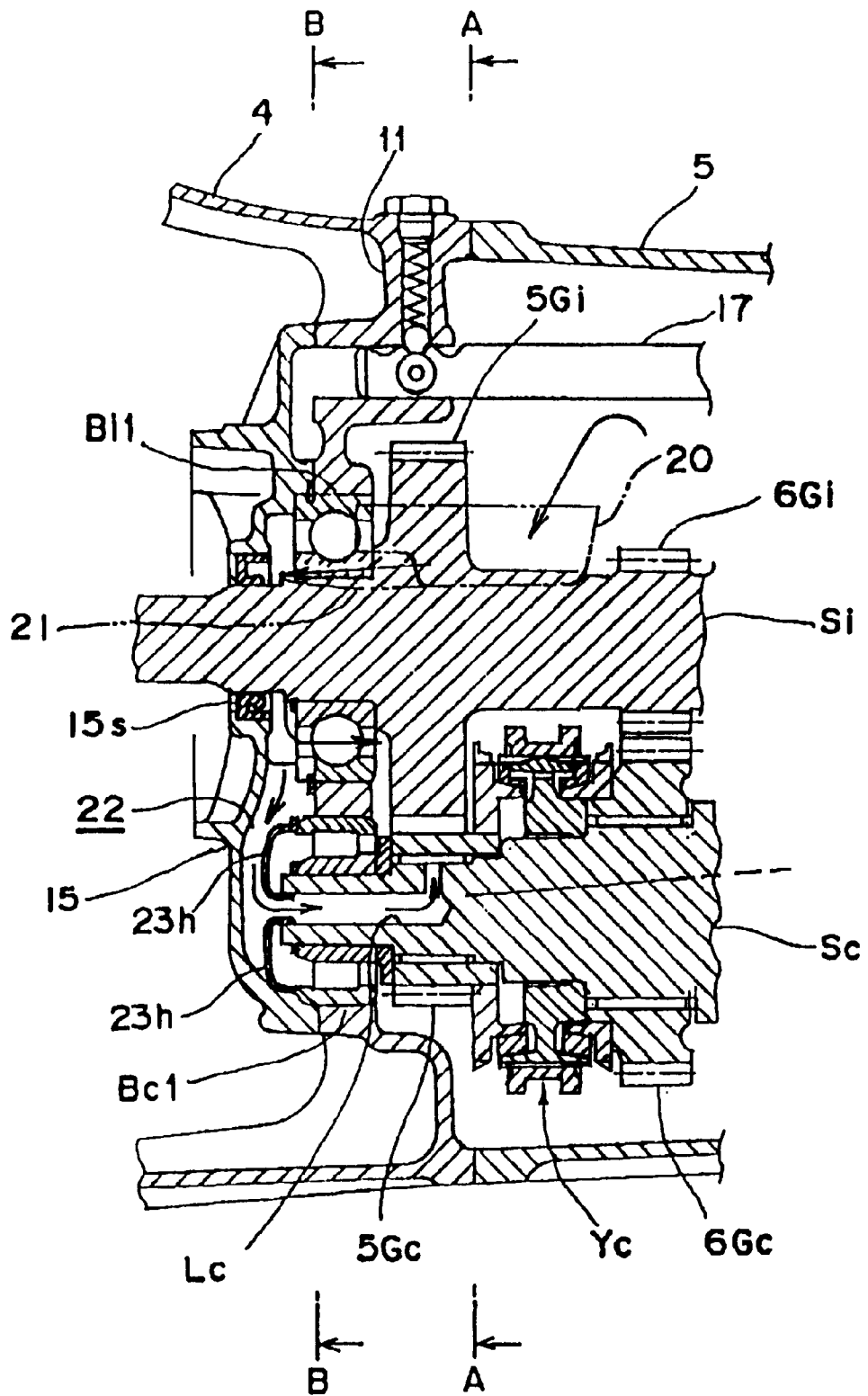
FIG. 2 is an enlarged cross-sectional view showing essential part of an input side of a transmission gear assembly of the transmission.
Figure 3:
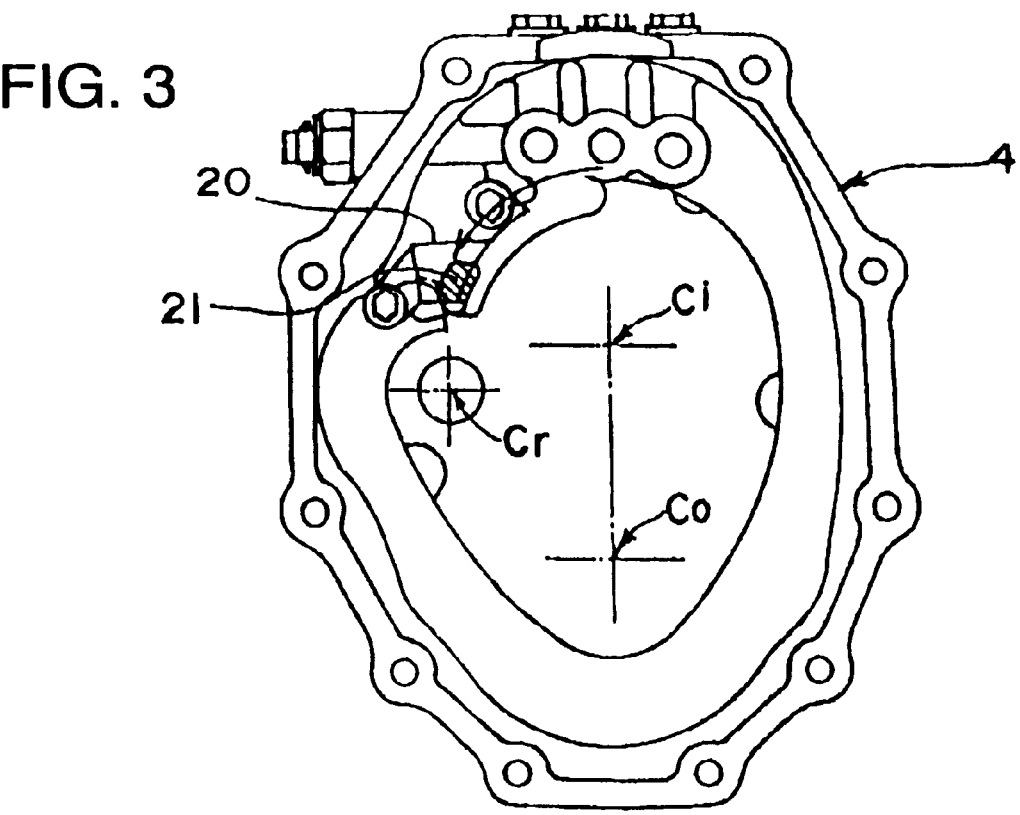
FIG. 3 is an end view of a clutch housing as viewed in a direction A—A in FIG. 2.
Figure 4:
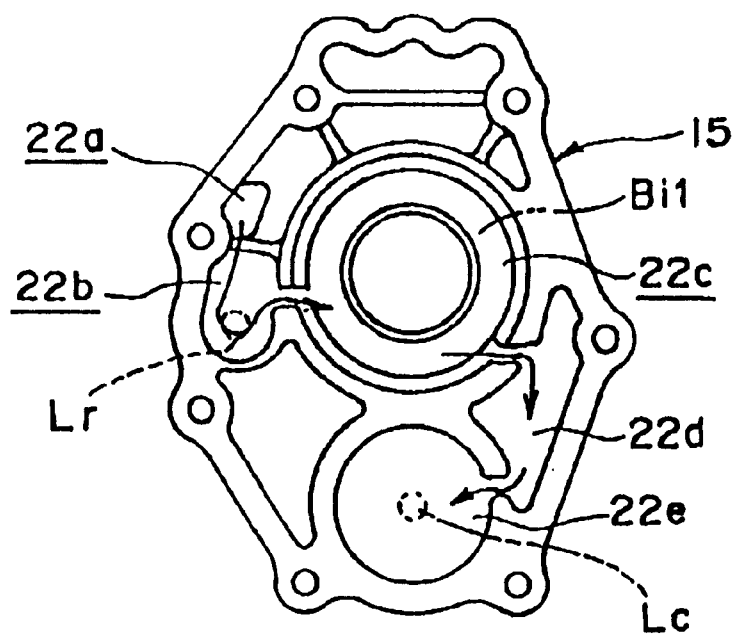
FIG. 4 is an end view of a front cover as viewed in a direction B—B in FIG. 2.

As shown in detail in FIGS. 2–4, in the interior of the transmission TM, there is provided an oil tray 20, laterally off the upper front of the fixed gear 5Gi of the fifth speed gear unit 5G, the foremost gear unit of the gear assembly and secured to the interior wall of the clutch housing 4, which collects oil splashes or drops splashed up by the counter shaft Sc and the gears thereon, and a connecting flow passage of oil 21 leading to an oil chamber 22 defined by the partition 11, bearings Bil and Bcl fitted to the partition 11 and the front cover 15. As shown in FIG. 4, the oil chamber 22 comprises an oil catcher 22a corresponding in position to the connecting flow passage of oil 21, an oil reservoir 22b corresponding in position to the axial flow passage of oil Lr of the reverse idler shaft Sr, a bearing support bore 22c in which the ball bearing Bil is fitted, a bearing support bore 22e in which the cylindrical roller bearing Bcl is fitted, and an oil reservoir 22d between the bearing support bores 22c and 22e, all of which are formed in the front cover 15 and form an oil gallery. A route of oil supply is defined by the oil gallery. Another front cover formed with a different pattern of oil gallery may be employed to provide a different route of oil supply, As shown in FIG. 5, an oil sealing ring or gasket 15s is incorporated between the input shaft Si and opening of the front cover 15. Forming an oil chamber with such an oil gallery guarantees a high degree of freedom of laying out of flow passages of oil. The counter shaft Sc at its input end is formed with a short axial flow passage of oil Lc. An annular space between the inlet end of the axial flow passage of oil Lc and the outer race of the cylindrical roller bearing Bcl supporting the end of the counter shaft Sc is covered by an end cover 23h.

With the fixed reduction gear type of transmission TM with the flow passage of oil which supplies lubricating oil to moving parts through the reverse idler shaft Sr, the input shaft Si and the counter shaft Sc in this order, the bearing of the reverse idler gear Gr is reliably supplied with oil. Further, since these the reverse idler shaft Sr, the input shaft Si and the counter shaft Sc are also arranged in the order of difficulty of oil supply, moving parts on each shaft are lubricated reliably and efficiently to be prevented from seizing.

In order to reduce the amount of lubricating oil necessary to stay in the transmission case and lubricate the gear assembly at the output side and other moving parts, such as bearings, reliably and efficiently, the transmission TM imposes a burden as an oil pump on the reduction gear unit, i.e. the reduction gear unit 4G. Specifically, as was previously described, while the gears other than the counter gear 4Gc of the reduction gear unit 4G as a counter reduction gear are made small, the counter gear 4Gc of the reduction gear unit 4G has a large face width and is made strong and rigid due to the necessity of reducing a rotation of the counter shaft Sc and transmitting it to the output shaft So with torque multiplication. Further, the counter shaft Sc turns at a speed significantly higher in higher speed gears as compared with the input reduction gear type of transmission, the forth speed gear unit 4G turns at a considerably high speed. For those reasons, parts of each of the counter shaft Sc and the output shaft So must be rigidly supported on opposite sides of the gears 4Gc and 4Go of the reduction gear unit 4G.

Figure 8:
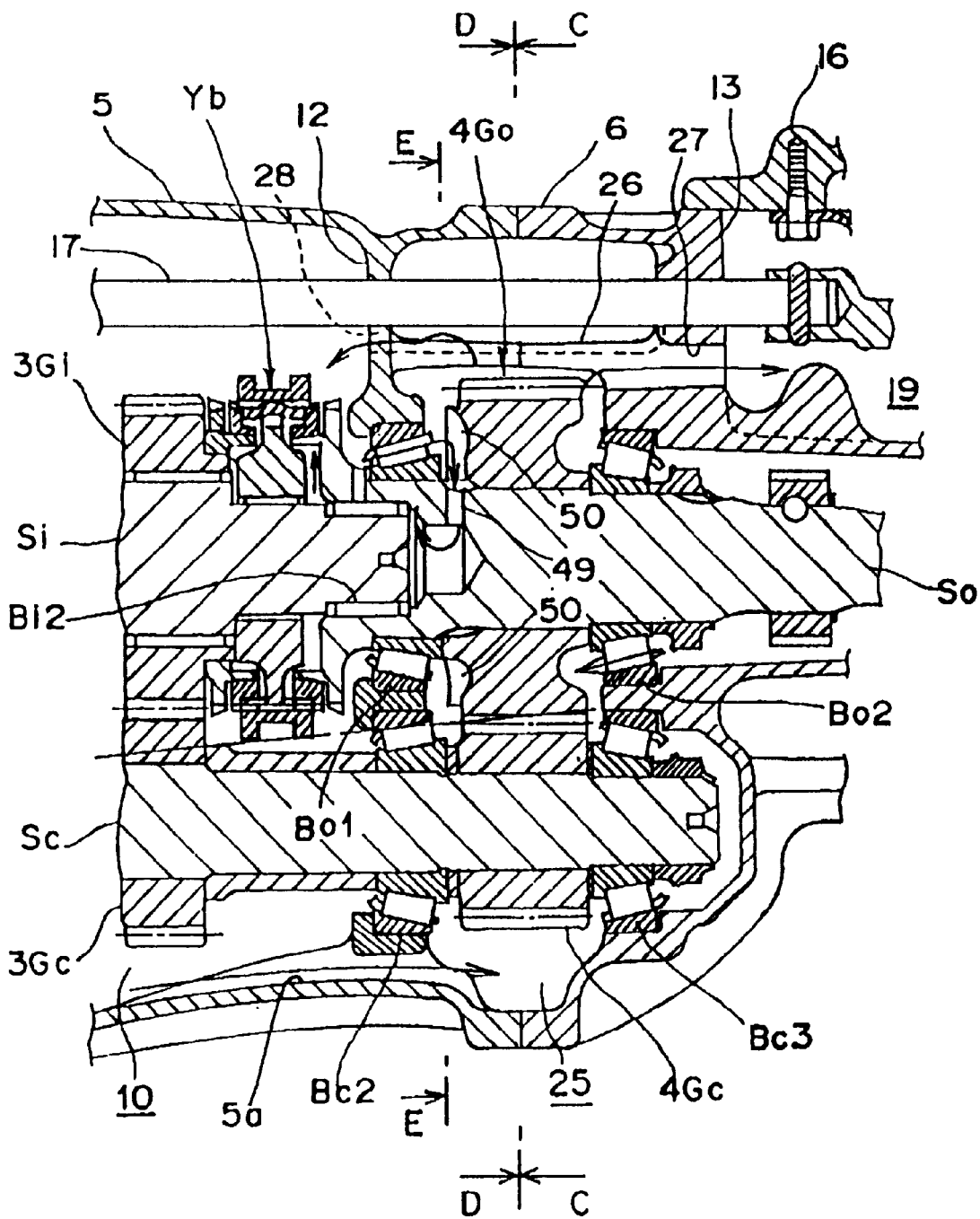
FIG. 8 is an enlarged cross-sectional view showing essential part of an output side of the transmission gear assembly of the gear type of transmission shown in FIG. 1.

As shown in FIG. 8, the transmission TM is provided in the interior thereof with a reduction gear chamber 25 formed by the partitions 12 and 13 on opposite sides of the reduction gear unit 4G, respectively, and the transmission case. The partitions 12 and 13 support bearings Bo1 and Bo2 disposed on the output shaft So on opposite sides of the output forth speed gear 4Go and bearings Bc2 and Bc3 disposed on the counter shaft Sc on opposite sides of the counter forth speed gear 4Gc. Lubricating oil is easily drawn into the reduction gear chamber 25 due to a certain degree of negative pressure produced due to a high speed rotation of the counter shaft Sc. In other words, the reduction gear unit 4G works as an oil pump. In this embodiment, the utilization is made of tapered roller bearings, which withstand both high radial load and high thrust load, for the bearings Bo1, Bo2, Bc2 and Bc3, providing a strong and rigid support structure of the output shaft So and the counter shaft Sc. The utilization of tapered roller bearings creates a fluid flow path directed from the smaller diameter of the inner race toward the larger diameter thereof due to the effect of centrifugal force generated by revolutions of the inner race and rollers of the bearing to which the shaft is fitted. Accordingly, lubricating oil is easily drawn into the reduction gear chamber 25 through the tapered roller bearings along the fluid flow paths shown by solid arrows in FIG. 8, and the supplied amount of lubricating oil depends upon the rotational speed of the output shaft So and/or the counter shaft Sc.

Output reduction gear, i.e. the output reduction gear 4Go, is integrally formed, or otherwise provided, with fins 50 on the front surface to scoop and direct lubricating oil into a radial flow passage of oil 49 for lubrication of a needle bearing Bi2 fitted to the extreme end of the input shaft Si. The transmission TM collects oil in a bottom reservoir 10 which lubricates the counter gear assembly including 5Gc, 6Gc and 1Gc–3Gc arranged in this order from the input side are lubricated. Further, the partition 12 at its lower end is cut off to provide an oil inflow passage 5a between the bottom reservoir 10 and a bottom portion of the reduction gear chamber 25, through which the lubricating oil in the reservoir is easily drawn into the reduction gear chamber 25.

Figure 9:
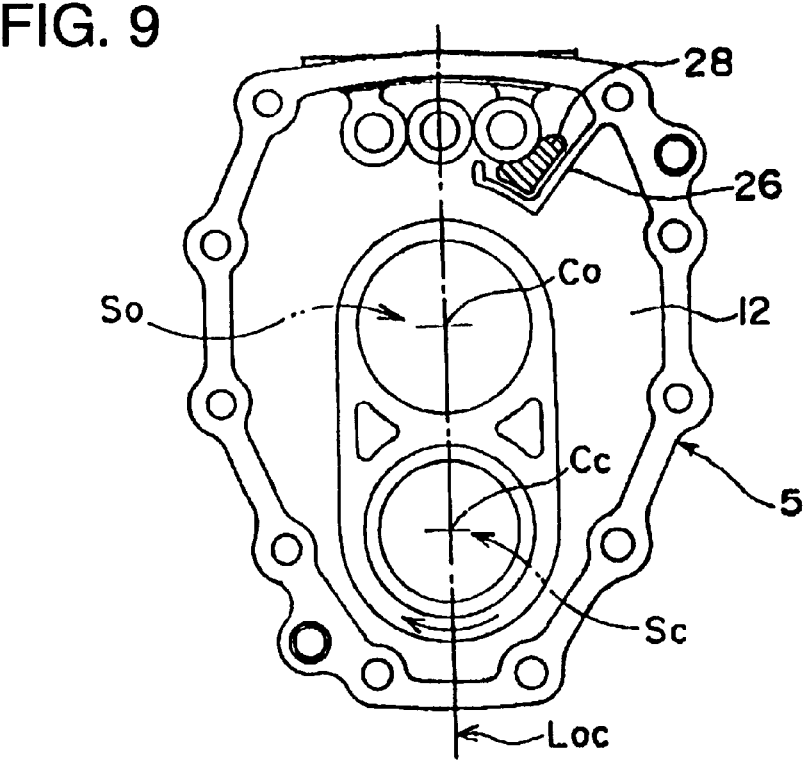
FIG. 9 is an end view of a transmission housing as viewed in a direction C—C in FIG. 8.
Figure 10:
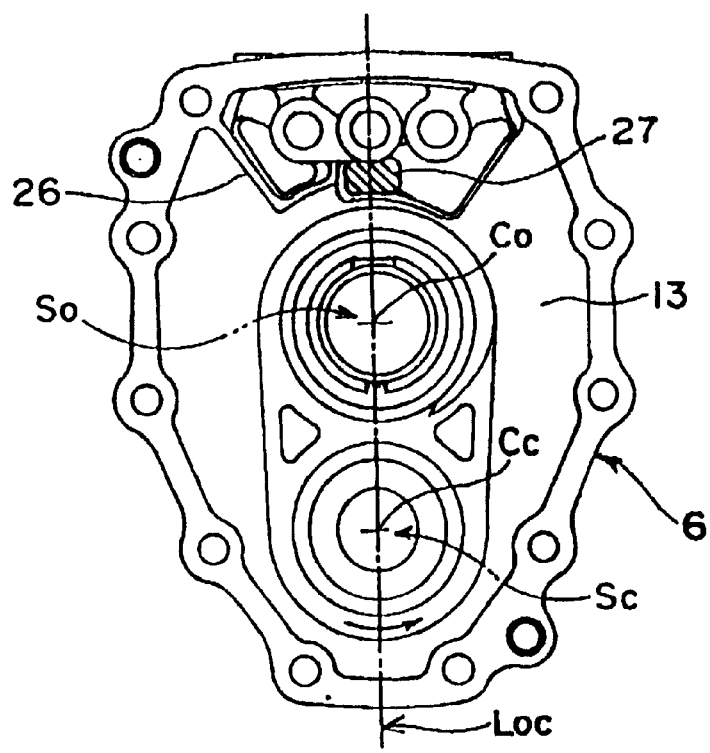
FIG. 10 is an end view of an extension housing as viewed in a direction D—D in FIG. 8.

Referring to FIGS. 9 and 10, the transmission housing 5 at its rear end is provided, or may be formed integrally, with an oil tray 26 disposed above the reduction gear unit 4G so as to collect oil splashes or drops splashed by the reduction gear unit 4G therein. The oil tray 26 is positioned laterally off a vertical plane Loc in which axial center lines Co and Cc of the output shaft So and the counter shaft Sc lie, so as to cause no interference with parts of the partitions 12 and 13 where the shift rods 17 are supported. It is preferred that the oil tray 26 is positioned off the vertical plane Loc on the side remote from a housing wall to which the counter shaft Sc directs splashes of oil directly. The splashes of oil are mostly directed to the wall of the transmission case first and then flow down along the interior wall of the transmission case. The oil collected in the oil tray 26 flows out of the reduction gear chamber 25 through a return flow passage of oil 28 formed in the partition 12. The oil flowing out of the reduction gear chamber 25 is partly directed into the shift lever gate chamber 19 in which the shift lever 2 and the shift rods 17 (only one of which appears in FIG. 1) are partly accommodated through an oil outflow passage 27 formed in the partition 13 and partly returned into the bottom reservoir 10 in the transmission housing 5 through the return flow passage of oil 28. The lubricating oil supplied into the shift lever gate chamber 19 lubricates the sleeve shaft 3. In the case that the oil tray 26 is formed as integral parts of the transmission housing 5 and the extension housing 6, oil received by the oil tray 26 dissipates heat efficiently through the transmission case. The off set position of the oil tray 26 makes it possible to cool the splashes of oil during flowing down to the oil tray 26 along the interior wall of the transmission case due to dissipation of heat through the wall and to collect the splashes of oil efficiently. Further, the off set position of the oil tray 26 allows the transmission case to have a decreased overall height.

As described above, with the construction of the output reduction gear type of transmission TM of the invention that the partitions 12 and 13 disposed on opposite sides, i.e. the input side and the output side, of the reduction gear unit 4G, respectively, are provided with means comprising the tapered roller bearings Bo1, Bo2, Bc2 and Bc3 and the oil inflow passage 5a for supplying oil into the reduction gear chamber 25 defined between the partitions 12 and 13 and means comprising the oil tray 26 and the return flow passage of oil 28 for allowing oil splashed by the counter reduction gear 4Gc to flow out of the reduction gear chamber 25, it is made possible to impose a burden as an oil pump on the reduction gear unit 4G which comprises gears having large face widths and rotates at a high speed. In addition, even when a reduced amount of oil is used, moving parts necessary to be lubricated are supplied with oil reliably and efficiently. In other words, while the moving parts are reliably supplied with oil, it is realized to reduce stir resistance of the oil caused due to rotations of the counter shaft Sc and the counter gears 1Gc–6Gc, which leads to suppression of an increase in oil temperature and control of aggravation of the mechanical efficiency of power transmission as well.

For the input side part of the gear assembly comprising the various speed gear units 1G–6G, a series flow passage of oil is incorporated, which comprises three parts of flow passages of oil formed in the reverse idler shaft Sr, the input shaft Si and the counter shaft Sc, respectively and connected in this order. This flow passage of oil makes it possible that, even while a somewhat reduced amount of oil is utilized, oil is reliably and efficiently supplied to the necessary moving parts related to those shafts. On the other hand, for the output side part of the gear assembly, the utilization is made of the reduction gear unit 4G enclosed in the reduction gear chamber 25 both for a reduction gear unit and for an oil pump. This makes it possible that, even while a somewhat reduced amount of oil is utilized, oil is reliably and efficiently supplied to the necessary moving parts. Accordingly, in the output reduction gear type of transmission of the invention, while the gear assembly is properly lubricated at an input and an output side, the whole gear assembly is efficiently supplied with lubricating oil. In addition, it is realized to reduce stir resistance of the oil caused due to rotations of the counter shaft and the counter gears with the result of suppression of an increase in oil temperature and control of aggravation of the mechanical efficiency of power transmission.

As described in detail above, with the output reduction gear type of transmission TM of the invention, the reduction gear, whose component gears have large face widths and turn at a rotational speed higher as compared with the conventional input reduction gear type of transmissions, and the reduction gear chamber having an oil supply means and an oil return means cooperate to work as an oil pump for lubrication. This lubrication system realizes proper and efficient lubrication of the gear assembly and its associated moving parts with an decreased amount of oil. In other words, it is realized to reduce stir resistance of the oil caused due to rotations of the counter shaft and the counter gears with the result of suppression of an increase in oil temperature and control of aggravation of the mechanical efficiency of power transmission.

The utilization of tapered roller bearings for supporting the counter shaft and/or the output shaft creates a fluid flow path directed from the smaller diameter of the inner race toward the larger diameter thereof due to the effect of centrifugal force generated by revolutions of the inner race and rollers of the bearing to which the shaft is fitted, so that lubricating oil is easily drawn into the reduction gear chamber through the tapered roller bearings along the fluid flow paths correspondingly in amount to the rotational speed of the output shaft or the counter shaft. Forming the partition with a cut out provides an oil flow passage between the bottom reservoir and the reduction gear chamber, so that the lubricating oil in the bottom reservoir is easily drawn into the reduction gear chamber.

Oil tray adapted to cooperate with the oil outflow passage ensures outflow of oil splashed by the reduction gear unit. Forming the oil tray integrally with a side wall of the transmission case enhances dissipation of heat of the oil flowing out from the reduction gear chamber through the transmission case and reduces the number of parts necessary to provide the oil tray. Furthermore, positioning the oil tray off the vertical plane including the center lines of rotation of the output shaft and the counter shaft decreases the overall height of the transmission case. The oil tray positioned off the vertical plane on the side remote from a housing wall toward which the counter shaft and/or the reduction gear splashes oil directly, so that the oil tray collects the oil splashes efficiently. The oil splashes mostly flow down along the interior wall of the transmission case and then are collected by the oil tray, so that the oil splashes are effectively cooled during flowing down to the oil tray 26 along the interior wall of the transmission case due to dissipation of heat through the wall.

The transmission of the invention is further provided with a flow passage of oil in the shafts at the input side of the gear assembly. This input side oil flow passage comprises three divisional oil flow passages which are formed in the reverse idler shaft, the input shaft and the counter shaft, respectively and connected in series in this order. This oil flow passage makes it possible that, even while a somewhat reduced amount of oil is utilized, lubrication of moving parts associated with those shafts is reliably and efficiently made.

As described above, with the output reduction gear type of transmission of the invention, it is realized that, while lubrication of the transmission gear and its associated parts is guaranteed, stir resistance of oil caused due to rotations of the counter shaft and the counter gears is significantly reduced with the result of suppression of an increase in oil temperature and control of aggravation of the mechanical efficiency of power transmission.

It is to be understood that the present invention may be embodied with various changes, modifications and improvements, which may occur to those skilled in the art, without departing from the spirit and scope of the invention defined in the following claims.

What is claimed is:

1. A manual transmission for an automotive vehicle, comprising:

an input shaft;

an output shaft coaxially aligned with said input shaft in a straight line;

a counter shaft disposed below in parallel with said input shaft and said output shaft and always operationally coupled to said output shaft by a reduction gear unit;

a plurality of gear units including forward gear units having different gear ratios and a reverse gear unit;

gear shift means for selectively bringing said gear units into operation to couple said input shaft and said counter shaft to transmit a rotation of said input shaft to said output shaft through said counter shaft so as thereby to provide the transmission with desired gear ratios;

a transmission case enclosing all of said shafts and said gear units and containing oil in a bottom section thereof:

partition means for forming a gear chamber in an output side section of said transmission case which encloses and isolates said reduction gear unit from said gear units, said partition means comprising a front and a rear partition which cooperate with interior walls of said transmission case;

oil supply means for supplying oil contained in said bottom section of said transmission case into said gear chamber; and oil return means for causing splashes of oil spattered by said reduction gear unit to flow out of said gear chamber toward said bottom section of said transmission case;

wherein said oil return means comprises:

an oil outflow passage formed in an upper part of said partition means above said reduction gear unit through which the inside and the outside of said gear chamber are communicated with each other; and an oil tray is formed integrally with said transmission case and disposed off a vertical plane enclosing center lines of rotation of said output shaft and said counter shaft to be adjacent to said oil outflow passage so as to receive splashes of oil spattered by said reduction gear unit.

2. A manual transmission as defined in claim 1, wherein said oil tray is positioned off said vertical plane on a side remote from a side wall of said transmission case to which said counter shaft directs splashes of oil directly.

3. A manual transmission for an automotive vehicle as defined in claim 1, further comprising:

a reverse idler shaft provided with a reverse idler gear which is capable of being brought into mesh with a reverse gear unit;

wherein said oil flow passage includes divisional oil flow passages formed in said reverse idler shaft and said counter shaft, respectively, and connected to each other so as to supply oil in said bottom section of said transmission case to moving parts to be lubricated on input side sections of said input shaft, said counter shaft and said reverse idler shaft through said oil flow passage.

4. A manual transmission as defined in claim 3, wherein said oil supply means comprises at least one tapered roller bearing for supporting said output shaft and said counter shaft on both sides of said reduction gear unit, each said tapered roller bearing being supported by at least one of said front and rear partitions.

5. A manual transmission as defined in claim 3, wherein said oil supply means comprises an oil inflow passage formed in a lower part of said partition means through which the inside and the outside of said gear chamber are communicated with each other.

6. A manual transmission as defined in claim 3, wherein said oil return means comprises an oil outflow passage formed in an upper part of said partition means above said reduction gear unit through which the inside and the outside of said gear chamber are communicated with each other.

7. A manual transmission as defined in claim 6, wherein said oil return means further comprises an oil tray disposed adjacent to said oil outflow passage to receive oil splashed by said reduction gear unit.

8. A manual transmission as defined in claim 7, wherein said oil tray is formed integrally with said transmission case.

9. A manual transmission as defined in claim 8, wherein said oil tray is positioned off a vertical plane enclosing center lines of rotation of said output shaft and said counter shaft.

10. A manual transmission as defined in claim 9, wherein said oil tray is positioned off said vertical plane on a side remote from a side wall of said transmission case to which said reduction gear directs splashes of oil directly.

* * * * *